United States Patent
Bergue et al.

(10) Patent No.: US 7,578,059 B2
(45) Date of Patent: Aug. 25, 2009

(54) METHOD FOR MANUFACTURING CONSTITUENTS OF A HOLLOW BLADE BY ROLLING

(75) Inventors: Jean-Pierre Serges Bergue, Soisy sous Montmorency (FR); Michel Breton, Rieux (FR); Jean-Michel Patrick Maurice Franchet, Paris (FR); Alain Georges Henri Lorieux, Sannois (FR); Philippe Francois Christian Sagot, Bois Colombes (FR)

(73) Assignee: SNECMA, Paris (FR)

( * ) Notice: Subject to any disclaimer, the term of this patent is extended or adjusted under 35 U.S.C. 154(b) by 662 days.

(21) Appl. No.: 11/193,443

(22) Filed: Aug. 1, 2005

(65) Prior Publication Data

US 2006/0026832 A1 Feb. 9, 2006

(30) Foreign Application Priority Data

Aug. 3, 2004 (FR) .................................. 04 51772

(51) Int. Cl.
B21D 53/78 (2006.01)
B23P 15/04 (2006.01)
B64C 11/04 (2006.01)
B63H 1/26 (2006.01)

(52) U.S. Cl. ..................... 29/889.7; 29/889; 29/889.23; 29/889.71; 29/889.72; 416/213 R; 416/232; 416/239

(58) Field of Classification Search ............ 29/888.024, 29/888.025, 889, 889.7, 889.72, 889.722, 29/889.23; 416/213 R, 232, 239, 241 R
See application file for complete search history.

(56) References Cited

U.S. PATENT DOCUMENTS

| 2,266,858 | A | * | 12/1941 | Gehret | ........................ 416/232 |
| 2,633,776 | A | * | 4/1953 | Schenk | ........................ 409/132 |
| 3,858,428 | A | | 1/1975 | Thompson | |
| 4,012,168 | A | * | 3/1977 | Spellman | ................. 416/132 A |
| 4,529,452 | A | * | 7/1985 | Walker | ........................ 148/527 |
| 5,636,440 | A | | 6/1997 | Bichon et al. | |
| 5,711,068 | A | | 1/1998 | Salt | |
| 6,077,002 | A | * | 6/2000 | Lowe | ........................ 409/132 |
| 2001/0022023 | A1 | | 9/2001 | Wallis | |

FOREIGN PATENT DOCUMENTS

EP 1 338 353 A1 8/2003

* cited by examiner

*Primary Examiner*—David P Bryant
*Assistant Examiner*—Alexander P Taousakis
(74) *Attorney, Agent, or Firm*—Oblon, Spivak, McClelland, Maier & Neustadt, P.C.

(57) ABSTRACT

In a method for manufacturing a hollow blade for a turbomachine, the blade is made from a preform derived from external primary parts. Each primary part comprising a root part is formed by flattening a blank cut out from a ring with a large diameter provided with a protuberance, in order to reduce costs.

13 Claims, 4 Drawing Sheets

METHOD FOR MANUFACTURING CONSTITUENTS OF A HOLLOW BLADE BY ROLLING

TECHNICAL FIELD

This invention relates in general to the field of methods for manufacturing of turbomachine blades, such as hollow fan blades or any other type of rotor or stator blade for a turbomachine or propulsion system.

STATE OF PRIOR ART

A hollow fan blade for a turbomachine normally comprises a relatively thick root used to fix this blade into a rotor disk, this root being extended radially outwards by a thin aerodynamic part called the blade airfoil.

Prior art (for example see U.S. Pat. No. 5,636,440), describes a method for manufacturing such a hollow blade based mainly on use of the diffusion bonding technique combined with the superplastic forming technique. In this method according to prior art, two or three constituents of the blade are defined first of all and are then made separately before being superposed and assembled to each other using the diffusion bonding technique in order to obtain a required blade preform.

The next step is to create the aerodynamic profile of the previously manufactured preform, and then inflation of this preform by applying gas pressure and superplastic forming of this preform so as to create a blade in approximately its final shape before terminal machining.

As mentioned above, manufacturing of the blade preform includes a step to produce at least two external primary parts. Typically, external parts are made by machining blanks of primary parts. Each of the two machined external parts has two radially opposite portions with very different thicknesses: the thick root part is used to fix the blade in the rotor disk, and the thin aerodynamic airfoil part extends from the root part towards the radially external end.

Different techniques have been used to manufacture these external parts. For example, document U.S. Pat. No. 3,858,428 describes rolling of two partially superposed plates so as to obtain a thicker portion of a part for which the plates are not superposed.

Document U.S. Pat. No. 5,711,068 describes a method consisting of producing parallelepiped-shaped parts from a metallic material longer than the preform (from the root part to the airfoil part), with a thickness similar to the thickness of the root part. Each parallelepiped is then cut obliquely so as to form two parts with a longitudinally tapering thickness.

These methods are complex to implement and their limiting maximum thicknesses of the root part are quickly reached, so that additional elements are conventionally added to form the root of the blade.

Therefore considering the thickness variations, manufacturing of external parts that will at least partially form the perform of the blade create very high additional material costs and machining costs, such that the hollow blade manufacturing method is absolutely not optimised.

DISCLOSURE OF THE INVENTION

The purpose of the invention is to propose a manufacturing method for a hollow blade for a turbomachine at least partially correcting the disadvantages mentioned above.

More precisely, according to one of its aspects, the invention relates to a method for manufacturing blanks of external primary parts that introduces significantly lower manufacturing costs than those encountered in prior art.

In particular, according to one of its aspects, the invention relates to the use of form rolling to create a blank of an external primary part and the use of tubular-shaped feed to create a hollow blade.

Another aspect of the invention relates to cutting longitudinal segments in a tubular ring corresponding to one or several primary part blanks. These segments or the blanks can then be flattened so that they can be used as in prior art for finishing of parts and/or for making a hollow blade, for example by a diffusion bonding method possibly accompanied by superplastic forming.

Advantageously, a sector taken from the ring is used to make more than one primary part blank and at least one section is cut from the thickness of the segment.

Preferably, the ring includes a protuberance at at least one of its ends to form the root portion of the primary part. The ring may be made by circular form rolling.

BRIEF DESCRIPTION OF THE FIGURES

The characteristics and advantages of the invention will be better understood after reading the following description with reference to the attached drawings given for illustrative purposes and in no way limitative, in which.

DETAILED DISCLOSURE OF PARTICULAR EMBODIMENTS

Figure 1:
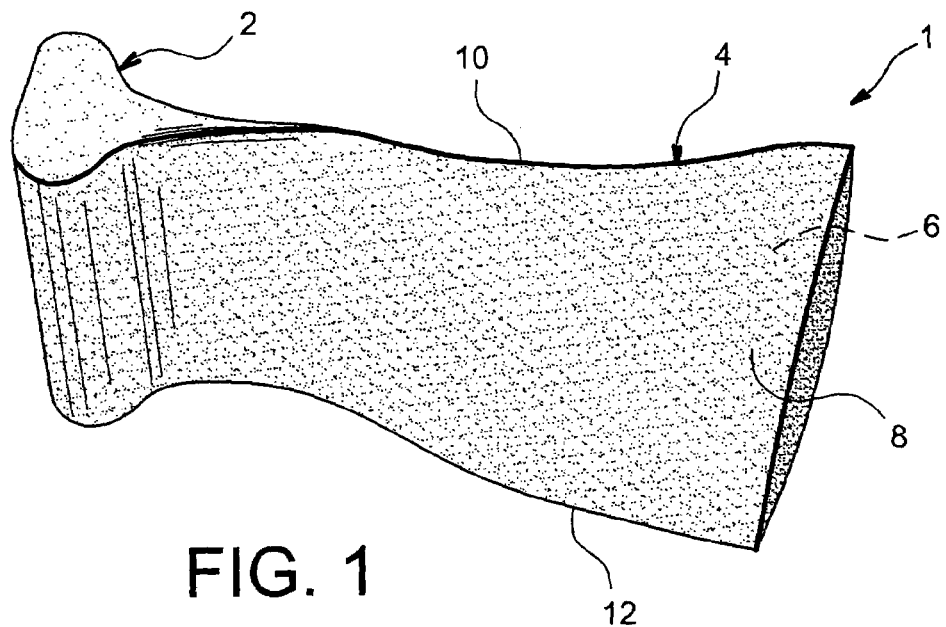
FIG. 1 shows a conventional turbomachine hollow blade.

FIG. 1 shows a hollow blade 1, of the large chord turbofan rotor blade type, for a turbomachine (not shown). The geometry of this type of blade is complicated; for example it may be made from titanium or a titanium alloy such as TA6V, and it comprises a root 2 prolonged by an airfoil 4 in a radial direction. The airfoil 4, will be placed in the circulating flowpath of an airflow through a turbomachine, and is fitted with two external surfaces called the extrados surface 6 and the intrados surface 8, connected through a leading edge 10 and a trailing edge 12.

This type of complex profile for a hollow blade is preferably made using the SPF/DB <<Super Plastic Forming/Diffusion Bonding>> technique.

Figure 2:
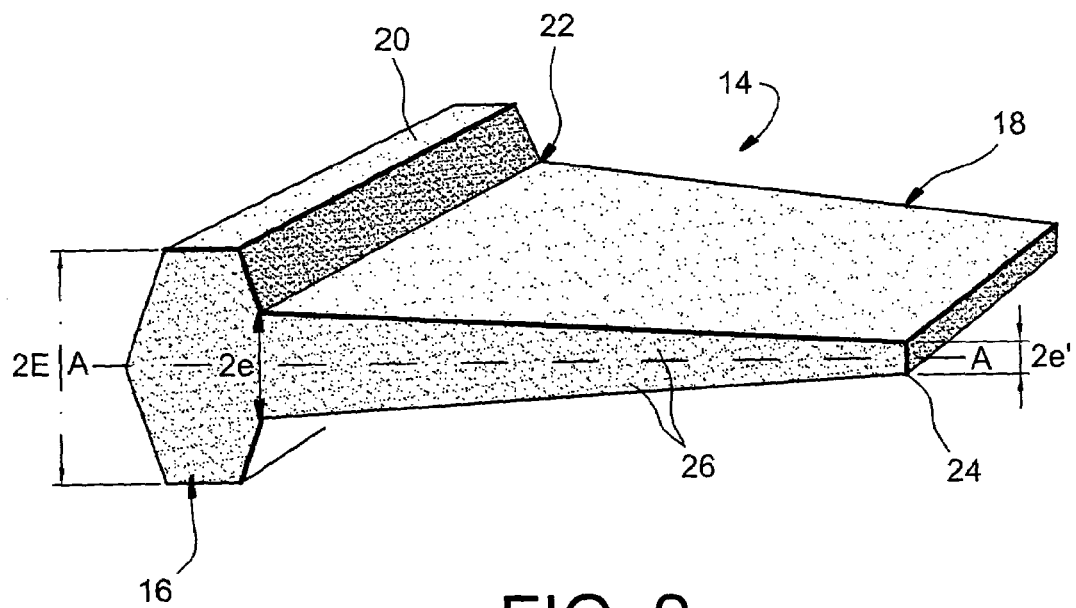
FIG. 2 shows a blade preform like that obtained after diffusion bonding or as modelled to define the primary parts.

Regardless of what method is used, the first step consists of modelling the profile of the blade 1 to obtain a preform that can be manufactured by welding primary parts: the intrados and extrados walls or their graphic representation are in contact on the same plane. This operation may be done by simulation using CAD (Computer Aided Design) means, for example consisting of deflation followed by untwisting and straightening, in order to obtain a preform 14 like that shown in FIG. 2.

This preform 14 comprises a root part 16 that is extended in a radial direction by an airfoil part 18. As can be seen on this FIG. 2, the root part 16 is provided with an internal portion 20 that has a high average thickness 2E, and will subsequently be used to fix the blade in a rotor disk of the turbomachine.

The airfoil part 18 of the preform 14 is provided with a radially internal end 22 with a thickness 2e and a radially external end 24 with a thickness 2e', usually less than the thickness 2e. However, the thickness of the airfoil part 18 of the preform 14 is approximately uniform.

Figure 3:
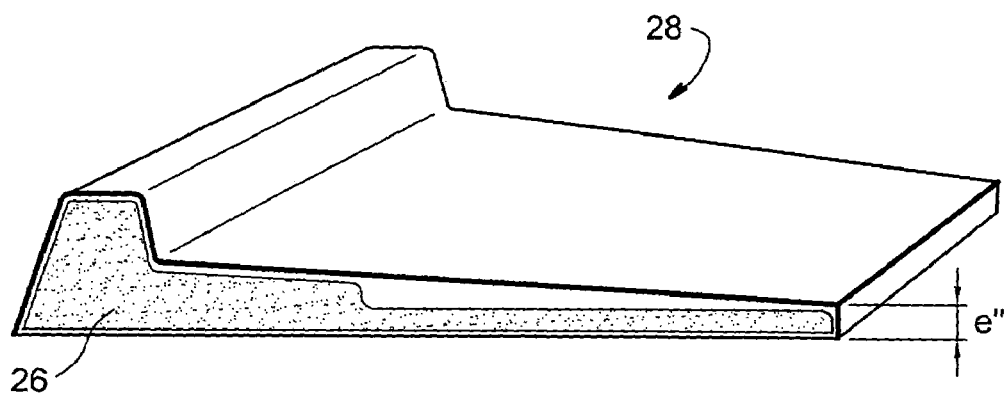
FIG. 3 shows a blank of a primary part, FIG. 4 show a perspective sectional view of the ring from which the blanks are taken, FIG. 5 diagrammatically shows a ring manufacturing method, and FIG. 6 show different wall profiles for a ring used according to the invention.

In order to make the preform 14 (which for a hollow blade 1 must be inflatable and therefore cannot be composed of a single block), primary parts 26 will be defined that will be fixed to each other. The definition of the primary parts 26 determines the shape of the blanks 28 diagrammatically shown in FIG. 3 that will be machined to obtain these primary parts. Despite all efforts, the profile of the primary part blanks 28 thus determined will be complex, particularly including a root part with a thickness of the order of E and a long airfoil part for which the thickness is practically constant and is of the order of e">e>e'. For example, the thickness E of the root portion of the primary part 26 and the blank 28 may be of the order of 20 to 40 mm for a 0.6 m to 1.2 m long airfoil part, and the thickness e" of the blank 28 may be between 8 and 15 mm, and preferably on average of the order of 10 mm.

Figure 4B:
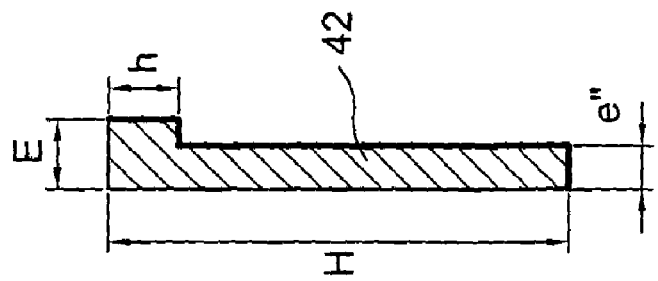
Figure 4A:
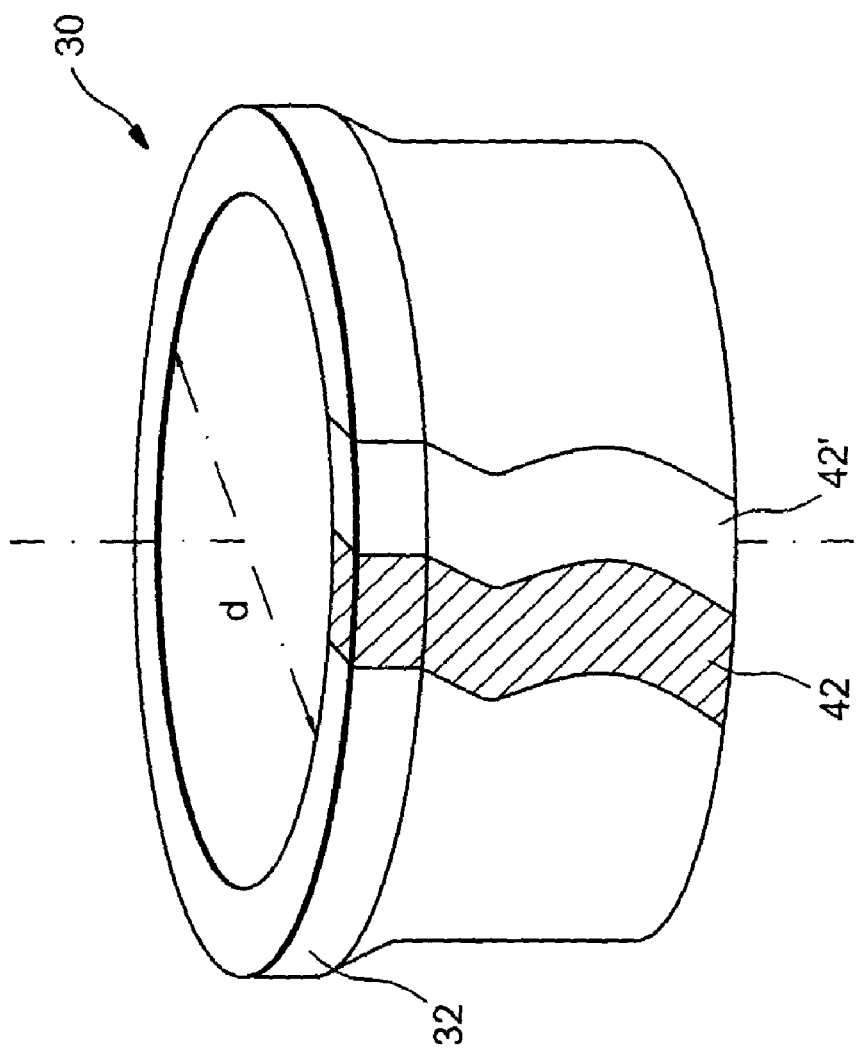

According to the invention, it is proposed to make blanks of external primary parts 28 from a hollow tubular element or ring like that shown diagrammatically in FIGS. 4A and 4B. The height H of the ring 30 is of the order of the length of the primary parts to be made, in other words the length of the airfoils 1, namely for example 0.6-1.2 m; the thickness of the wall of the ring 30 is approximately constant and equal to e" over most of the height H, for a diameter d of the order of 4 m for example.

Furthermore, the ring 30 is provided with a rotuberance 32 with thickness E and height h at one of its ends. This protuberance is intended to make the root portion 16 of the primary part 26 and its height h is therefore chosen as a function of this root portion; for example, the height h could be of the order of 30 to 40 mm. In this embodiment, the protuberance 32 advantageously projects on only one side of the walls of the ring 30, towards the inside or the outside, while the other side of the wall remains linear in cross-section.

Figure 5:
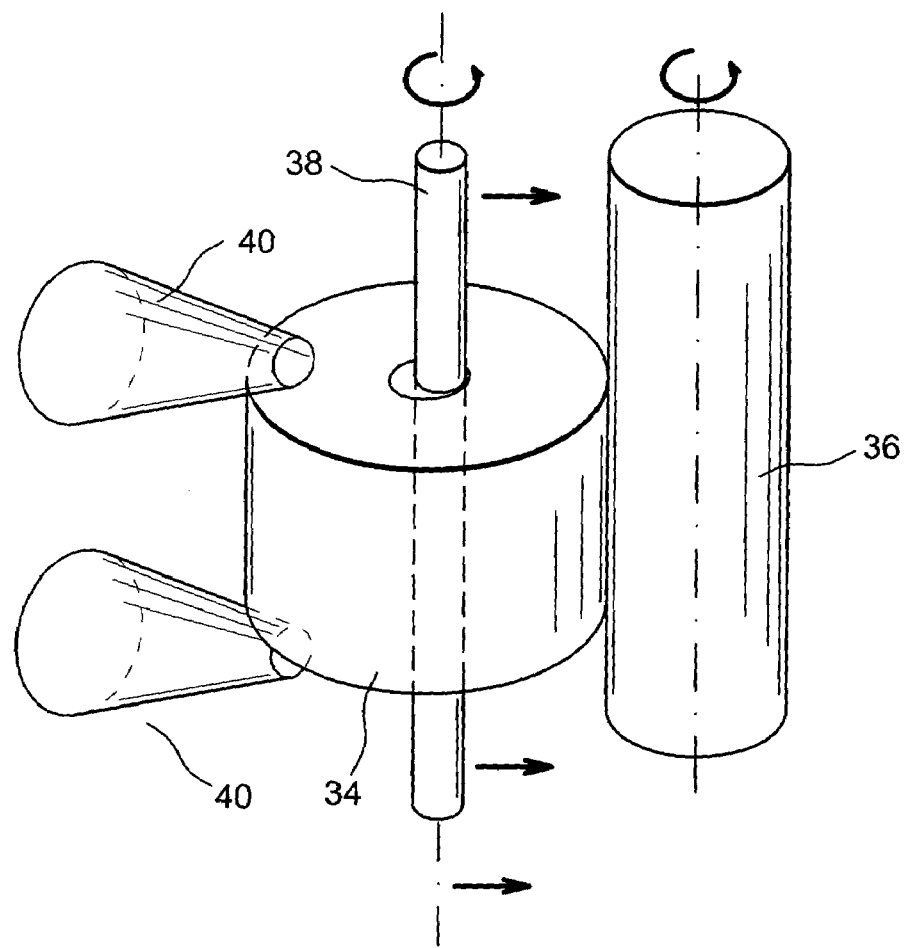

The ring 30 is preferably made using a form rolling method starting from a tubular feed, for example in the form of a billet: see FIG. 5. The initial billet 34 may for example be cast; it is rolled using a rotary roller 36, for example with a diameter of 1050 mm, located along its external surface. A rotating mandrel 38, for example with a diameter of 600 mm, inserted in the billet 34 is displaced in translation towards the roller 36 in order to refine the walls of the tube 34: due to friction forces, the billet 34 rotates about its axis that is mobile and its thickness reduces uniformly while its inside and outside diameter increase. Supports 40, for example at a separation distance of 1.2 m, maintain the height of the tubular element 34 to assure a uniform rolling thickness. A protuberance 32 from the final ring 30 may be obtained by cutting the roller 36 and/or the mandrel 38; a gradient could also be envisaged in the thickness of the wall of the tubular element.

The configuration of rotation and translation speeds, the size of the initial grain of the billet 34, etc., provide setting means of obtaining a ring that corresponds to the required use.

The ring 30 is then cut in the direction of its height and around its circumference to form segments 42, 42'. Cutting may be done by laser, or by water jet, or by sawing. In this respect, it should be noted that with the method according to the invention, cutting a ring 30 has the additional advantage that segments or blanks 42 with a complex profile can be cut as shown diagrammatically in FIG. 4A: it is not essential to restrict the profile to a trapezoidal shape, and material losses are minimised even for a complex-shaped primary part, such as a sabre-shaped part.

The cut segment 42 is then <<flattened>>, by a conventional forging operation, and is then machined to the defined profile so as to form the blank 28 and then the primary part 26.

The cost of manufacturing the ring 30 is directly related to its height to thickness ratio H/e" as a function of its diameter d. A ring 30 with a diameter of more than 4 m becomes difficult to manipulate and a typical height H for existing blades 1 exceeds 1 m. Thus, a thickness greater than or equal to 30 mm is recommended for the ring 30, to keep the manufacturing costs of the ring 30 within reasonable limits.

It may be decided to take the segment 42 of a section and at the same time to cut this sector 42 in its thickness after it has been flattened, so as to reduce the thickness of the primary part: one or several sawings of segment 42 can thus give a plurality of blanks 28 and primary parts 26 with a similar surface but thinner.

FIG. 6 show different profiles of rings that can be used, particularly when a longitudinal cut follows sampling of the segment by cutting the ring in the direction of its height and around its circumference.

Figure 6A:
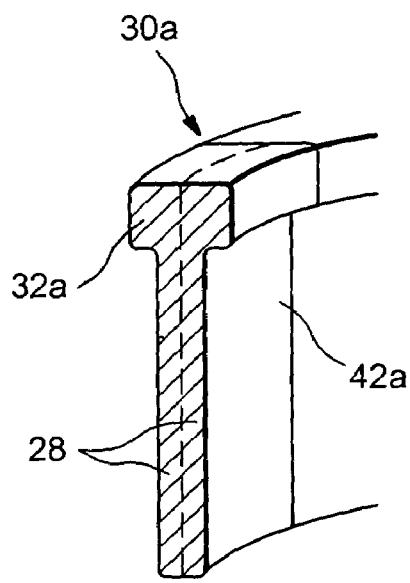

Thus, FIG. 6A shows a profile of a ring 30a in which the protuberance 32a projects at one end and on each side of the wall of the ring, both outwards and inwards. Once the segment 42a has been taken, it is possible to make a cut along the dashed line, in other words within the thickness of the sector 42a, so as to take two symmetrical primary part blanks 28.

Figure 6B:
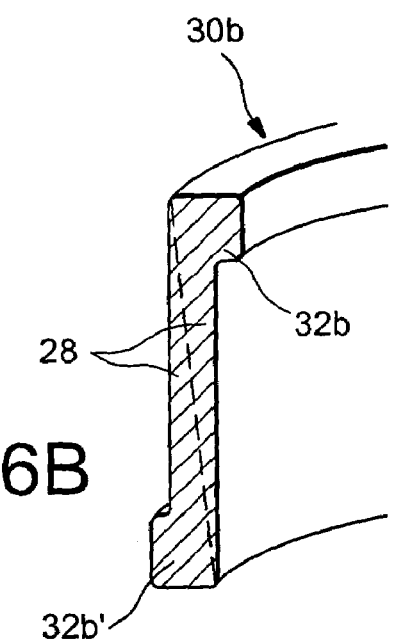

Another possibility relates to FIG. 6B in which two protuberances 32b and 32b' are present at each end of the ring 30b; in this case, one of the protuberances 32b projects inwards and the other protuberance 32b' projects outwards; the segment can then be cut diagonally as shown, or parallel to its sides in a manner similar to that in FIG. 6A.

Figure 6C:
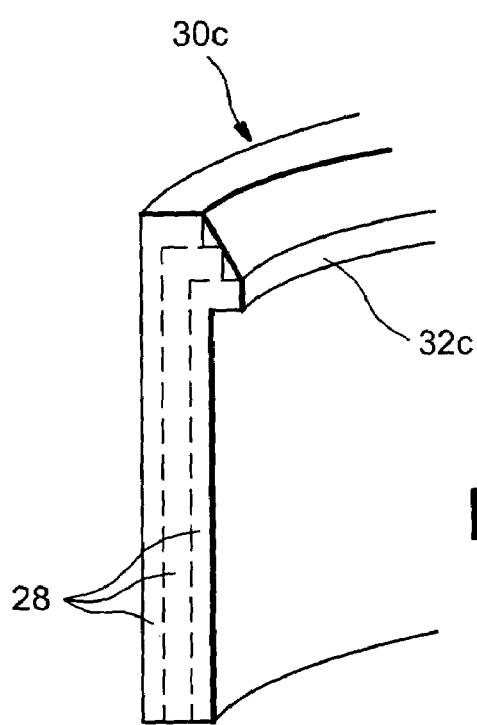

It is also possible to have successive cuts in the sector. FIG. 6C thus shows a profile of the ring 30c in which three primary part blanks are provided for each segment. As shown, it is possible to smooth the profile of the protuberance 32c instead of making it "step-shaped", to facilitate manufacturing of the ring 30c: material losses remain minimal.

It is obvious that many combinations of these solutions and alternatives to these profiles could be considered.

Advantageously, each rolling and/or flattening step of blanks and primary parts is done on hot metal, for example at about 900° C. for a titanium alloy and with a tool heated for example to between 100 and 300° C.

Once made, the external primary parts 26 are assembled to form a preform 14 and are fixed together. Depending on the size of the blade, the stresses that will be applied to it, etc., a primary support part in the form of a plate that will stiffen the hollow structure may be inserted between the parts. Advantageously, the parts are assembled by diffusion bonding. The preform 14, possibly adjusted to its aerodynamic profile, is then machined to obtain a blade 1. Preferably, this step is carried out by inflation by gas pressure and superplastic forming according to conditions known in the SPF/DB technique.

Therefore, with the method according to the invention, it is possible to make a blade and a blade preform from simple elements like rings, and with tested machining methods such as rolling, sawing and milling, even for complex primary parts. It should be noted that manufacturing of this type of complex part accounts for more than 40% of the cost of a blade; consequently, the manufacturing cost of a blade is very much reduced, considering the limitation of material losses and the reduction in machining operations, particularly precision machining operations. It should be noted that manufacturing tolerances for the shape of the ring (circularity, co-axiality) can be large; furthermore, this ring manufacturing step is unique for up to 60 primary parts.

The invention claimed is:

1. A method for manufacturing a primary part for a hollow blade for a turbomachine, comprising:
   manufacturing a ring by form rolling;
   cutting a blank of the primary part from said ring, said ring having a tubular wall with an initial thickness between two ends, by cutting the tubular wall between the two ends, the blank thus being cut from a wall segment between two end parts and its thickness being the initial thickness.

2. A method according to claim 1, wherein the ring includes a protuberance at least one end.

3. A method according to claim 1, comprising cutting out the wall segment in its thickness between its two end portions to obtain the blank.

4. A method according to claim 3, wherein the ring includes a protuberance at least one end.

5. A method for manufacturing a hollow blade for a turbomachine comprising a root and an airfoil, said method comprising:
   a step for making at least two external primary parts using the method according to claim 1; and
   a diffusion bonding step for welding the two primary external parts to make a blade preform, the blade preform comprising an airfoil part and a root part.

6. A method according to claim 5, wherein the diffusion bonding assembly step of the two external parts is followed by inflation by applying gas pressure and superplastic forming of said preform.

7. A method according to claim 6, further comprising manufacturing a third primary support part, the preform being composed of two external primary parts surrounding the primary support part.

8. A method according to claim 5, wherein the ring includes a protuberance at least one end.

9. A method according to claim 8, wherein the step for making the primary parts comprises the cut-out of the wall segment in its thickness between its two end portions.

10. A method according to claim 1, wherein said cutting comprises cutting said ring so as to obtain a plurality of blanks of primary arts for the hollow blade.

11. A method for manufacturing a primary part for a hollow blade for a turbomachine, said method comprising:
   cutting a blank of the primary part from a ring, said ring having a tubular wall with an initial thickness between two ends, by cutting the tubular wall between the two ends, the blank thus being cut from a wall segment between two end parts and it's thickness being the initial thickness, and
   flattening of the blank or the wall segment.

12. A method according to claim 11, comprising obtaining a cut-out of the wall segment in its thickness between its two end portions.

13. A method according to claim 12, comprising obtaining a plurality of cut-outs of the wall segment in its thickness between its two end portions.

* * * * *

UNITED STATES PATENT AND TRADEMARK OFFICE
CERTIFICATE OF CORRECTION

| | | |
|---|---|---|
| PATENT NO. | : 7,578,059 B2 | Page 1 of 1 |
| APPLICATION NO. | : 11/193443 | |
| DATED | : August 25, 2009 | |
| INVENTOR(S) | : Jean-Pierre Bergue et al. | |

It is certified that error appears in the above-identified patent and that said Letters Patent is hereby corrected as shown below:

Column 3, line 30, change "rotuberance" to --protuberance--.

Signed and Sealed this

Fifth Day of January, 2010

David J. Kappos
*Director of the United States Patent and Trademark Office*